United States Patent [19]

Eyre et al.

[11] Patent Number: 4,859,008

[45] Date of Patent: Aug. 22, 1989

[54] KNOCK-DOWN WARDROBE CABINET

[76] Inventors: Clarence W. Eyre, Rte. 1, Box 374, Dry Prong, La. 71423; William E. Stevens, 8409, Fairway, Pineville, La. 71360

[21] Appl. No.: 92,593

[22] Filed: Sep. 3, 1987

Related U.S. Application Data

[63] Continuation-in-part of Ser. No. 916,723, Oct. 8, 1986, abandoned, which is a continuation-in-part of Ser. No. 817,160, Jan. 8, 1986, abandoned, which is a continuation-in-part of Ser. No. 618,950, Jun. 8, 1984, abandoned.

[51] Int. Cl.[4] .............................................. A47B 43/00
[52] U.S. Cl. ................................. 312/257.1; 312/107
[58] Field of Search ............ 312/263, 257 R, 257 SM, 312/257 SK, 140, 107

[56] References Cited

U.S. PATENT DOCUMENTS

| | | | |
|---|---|---|---|
| 1,833,081 | 11/1931 | Kilmer | 312/257 R |
| 2,039,614 | 5/1936 | Tinnerman | 312/257 R X |
| 3,876,270 | 4/1975 | White | 312/257 R |
| 4,022,517 | 5/1977 | Eckert | 312/257 R |
| 4,045,104 | 8/1977 | Peterson | 312/257 R |
| 4,126,364 | 11/1978 | Reilly | 312/140 |

FOREIGN PATENT DOCUMENTS

| | | | |
|---|---|---|---|
| 2111170 | 9/1971 | Fed. Rep. of Germany | 312/257 SK |
| 907814 | 3/1946 | France | 312/257 R |
| 591948 | 4/1959 | Italy | 312/140 |

Primary Examiner—Joseph Falk

[57] ABSTRACT

A knock-down wardrobe cabinet comprises a back panel; two side panels; a first front frame member and a second front frame member; and a first back frame member and a second back frame member; wherein each back frame member has two substantially orthogonal channels, one of the orthogonal channels being dimensioned to receive a side edge portion of the back panel and the other orthogonal channel being dimensioned to receive a back edge portion of one of the side panels; and wherein each front frame has a channel dimensioned to receive one of the side panels. One side panel extends between and is received within channels of the first front frame member and the first back frame member, and the other side panel extends between and is received within channels of the second front frame member and the second back frame member when the cabinet is assembled. The back panel extends between and is received within channels of the first back frame member and the second back frame member when the cabinet is assembled. The frame members are of metal and are fixedly fastened to panels which are made of particle-board so that assembly of the cabinet on a reinforced base is achieved by metal-to-metal coupling and edge-in-channel insertion.

4 Claims, 7 Drawing Sheets

KNOCK-DOWN WARDROBE CABINET

CROSS REFERENCE TO RELATED APPLICATIONS

This is a continuation-in-part of application Ser. No. 916,723 filed Oct. 8, 1986 now abandoned which is a continuation-in-part of application Ser. No. 817,160, filed Jan. 8, 1986, now abandoned which is a continuation application of Ser. No. 618,950, filed June 8, 1984, now abandoned.

BACKGROUND OF THE INVENTION

Wardrobe cabinets, especially those employed by the government, are subject to frequent moving. Some wardrobe cabinets are made totally of metal and are welded to form primarily a single unit that is heavy and awkward to move.

Other wardrobe cabinets which are characterized as knock-down or prefabricated cabinets suffer from various other problems. For example, some lack stability, some are complicated to assemble and require numerous tools for assembly, some do not provide components that are conveniently configured for storage or transporting, and some require considerable fabrication in forming a cabinet structure.

SUMMARY OF THE INVENTION

The present invention addresses the problems introduced by other cabinets by providing in a first embodiment a wardrobe cabinet that features: (a) a stable rectangular box type base having a horizontal-x reinforcement structure therein; (b) metal-to-metal connections or fastening to effectuate on-site assembly; (c) particle board panels to reduce weight and cost while providing durability; and (d) edge-in-channel coupling where panels meet and where panels meet the base and top. The wardrobe cabinet preferably includes a back panel having (a) a side channel along each side thereof and (b) a lower portion; two side panels, each having a tab extending downward along the front edge thereof; two doors, each door being hingedly coupled to the front edge of a corresponding one of the two side panels; a base having (a) a channel along the back edge and sides edges thereof which is dimensioned to receive the lower portion of said back panel and side panels and (b) slots positioned and dimensioned to receive the tabs on said side panels; wherein each side panel has a back edge received by a back panel side channel, wherein each tab is inserted in a corresponding slot in said base, and wherein said back panel is received in the back edge channel of said base and said side panels are received in side edge channels of said base when the wardrobe cabinet is assembled; and a metal top member having two side channels and a back channel, each of which receives the upper edge portion of one of the side panels and back panel when the wardrobe cabinet is assembled.

L-shaped plates are used to couple the top's front return flange to side panels front frame members. Coupled to the side panels are metal tabs which extend downward therefrom and into slots in the base. The tab-in-slot and edge-in-channel couplings of the present wardrobe cabinet facilitate assembly and disassembly while also providing stable connection of wardrobe components. In accordance with the invention, assembly can be performed by use of only a screw driver. In this regard, metal pieces are fixedly fastened to the panels so that subsequent on-site assembly and disassembly require only simple metal-to-metal—as opposed to metal in particle board—fastening. This results in longer cabinet life and facilitated maintenance and assembly/disassembly.

In this first embodiment, the present invention provides for the mounting of an overchest atop the wardrobe cabinet. In this arrangement the wardrobe top is removed and the overchest bottom is installed in its place. The overchest is structured like the main cabinet therebelow—however, includes a hinged front flap rather than two hinged doors. Each hinge for the front flap is reinforced by fastening to a metal frame member and a backing plate. Also the wardrobe top panel with L-shaped brackets now becomes the top panel of overchest. L-shaped brackets rigidly couple side panel members of the overchest to a top panel member of the overchest. Coupled to overchest side panels are metal tabs which extend downward through overchest bottom and are rigidly coupled to front frame members of wardrobe.

A second embodiment of the present invention addresses the problems introduced by other cabinets by providing a wardrobe cabinet that features: j(a) a stable rectangular box type base having a horizontal trussstyle reinforcement structure therein; (b) metal-to-metal connections or fastening to effectuate on-site assembly; (c) particle board panels to reduce weight and cost while providing durability; and (d) rounded extruded aluminum channels coupling adjacent panels, and integrally connecting the base and top.

The wardrobe cabinet preferably includes a back panel, two side panels, two doors, a top and a base. Four vertical extruded members extend from the base to the top, engaging the edges of the panels to form the cabinet. The rear vertical extrusion frame members have two slots each, disposed at a 90PtoPt angle. One slot receives the back panel, the other slot receiving one of the side panels. The edge-in channel coupling of the present wardrobe cabinet facilitates assembly and disassembly while providing stable conneciton of wardrobe components. In accordance with the invention, assembly can be performed by use of only a screw driver. No connection is made to the panels, so that on-site assembly and disassembly require nly simple metal-to-metal, as opposed to metal in particle board, fastening. This results in longer cabinet life and facilitated maintenance and assembly/disassembly.

According to any embodiment of the invention, a relatively low cost, lightweight wardrobe cabinet is provided which can support a heavy load, can withstand frequent moving, requires little maintenance, and provides adequate security from pilferage while also featuring an attractive appearance.

Moreover, the invention achieves the objects of quick and easy assembly, reduced shipping cost due to the knock-down characteristics of the present wardrobe cabinet, and easy access through doorways.

By making all panel components of particle board with a surface of high pressure plastic and by making the base and frame members of steel and/or aluminum with baked on enamel, a durable, easily transportable, low cost, secure wardrobe cabinet is provided.

The overall design of the cabinet as described above provides, when assembled, a solid box frame structure which substantially resists distortion and has increased overall rigidity and strength. By providing edge in channel engagement and positive metal to metal engagement of components, the relative orientation of the structural elements is maintained. These structural elements, including the integral shelf which forms a ridged cross member, are configured to establish a ridged box frame which resists torsional distortion and bowing from forces applied as loads or shocks on the structure.

DETAILED DESCRIPTION OF PREFERRED EXEMPLARY EMBODIMENTS OF THE INVENTION

Figure 1:
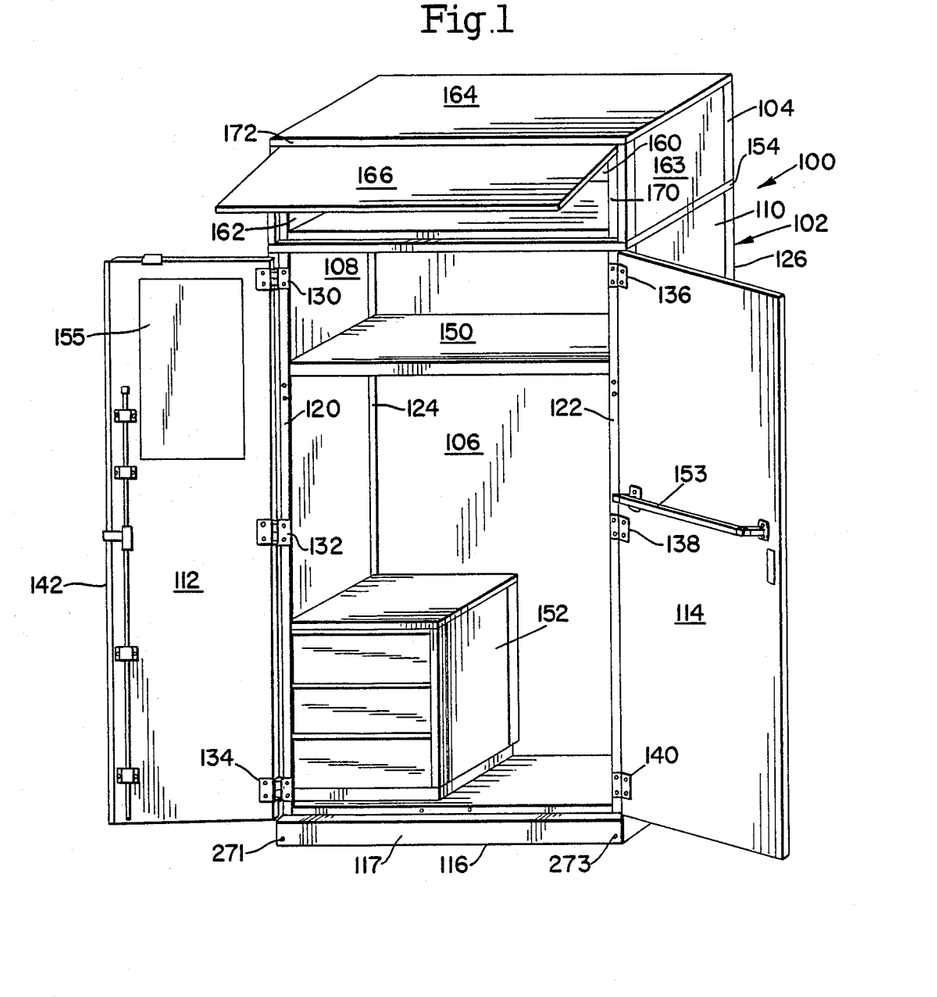
FIG. 1 is an upper front perspective view of a first embodiment of an assembled wardrobe cabinet with overchest according to the invention.

Referring to FIG. 1, a wardrobe cabinet 100 according to a first embodiment of the invention is shown in assembled form, including a basic cabinet 102 and an overchest 104.

The basic cabinet 102 includes a back panel 106, two side panels 108 and 110, two doors 112 and 114, and a base 116. Along the front edge of side panel 108 is a front frame member 120 and along the front edge of side panel 110 is a front frame member 122. Back frame members 124 and 126 are positioned where the back panel 106 and side panels 108 and 110, respectively, meet. The front frame members 120 and 122 and the back frame members 124 and 126 have channels therealong to receive respective panels (as discussed below). Hinges 130, 132, and 134 couple the door 112 to front frame member 120. Hinges 136, 130, and 140 couple the door 114 to front frame member 122. A shelf 150 is positioned to extend between the side panels 108 and 110. Also mounted within the cabinet 102 is a chest of drawers 152 and a towel rack 153 and mirror 155.

The doors 112 and 114 are provided with a three point latching mechanism to enable the secure closure thereof. Door 112, it is noted, has a metal—[referably Aluminum]—strip 142 which abuts door 114 when the doors 112 and 114 are closed shut. A padlock (not shown) is employable to maintain a secure locking of the doors 112 and 114.

A top member 164 is fastened atop the upper edges of the back panel 106 side panels 108 and 110.

The overchest 104 disposed atop the wardrobe is optional, but preferred. The overchest 104—using the overchest bottom 154 as a base—has a rectangular box shape with a front opening. Specifically, the overchest 104 has a back panel member 160, two side panel members 162 and 163, a bottom panel member 154, and a front flap 166. Disposed peripherally about the front opening is a rectangular metal frame 170. The front flap 166 is hingedly coupled to a cross-piece 172 that is secured to and along the front edge of the top panel member 164. The cross-piece 172 reinforces and adds structural rigidity to the hinge and cabinet structure.

Figure 2:
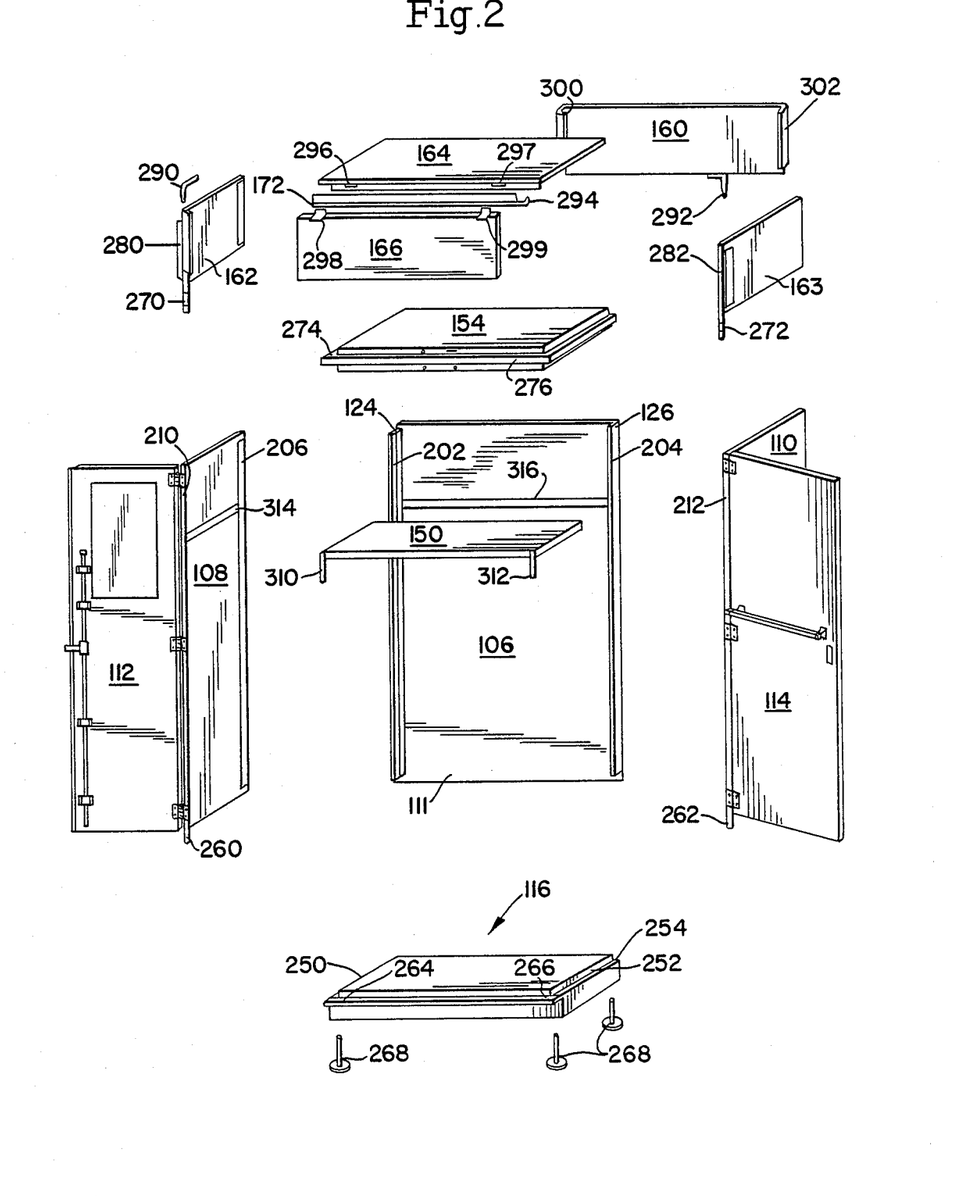
FIG. 2 an exploded view of a first embodiment of the wardrobe c illustrated in FIG. 1.

An exploded view of FIG. 1 is shown in FIG. 2. The back panel 106 is shown with two similar side channels 202 and 204 of back frame members 124 and 126 (of FIG. 1) respectively. A metal strip 206 extends along the back edge portion of each side panel 108 and 110. Each side panel 108 and 110 is insertable into a respective side channel 202 or 204 in an edge-in-channel arrangement. The inner ridge of each side channel 202 and 204 is held between the respective side panel 108 or 110 and the metal strip 206 thereof to form a tight fit. Each of the back frame members 124 and 126 also includes a second channel (not shown) orthogonal to the side channel thereof. The back panel 106 extends between the two second channels, each side edge of the back panel 106 being received by one of the two second channels with an edge-in-channel fit. The side panels 108 and 110 are thus joined to the back panel 106 by means of the orthogonal channels of the back frame pieces 124 and 126. The edge-in-channel fit is achievable by press-fitting the edge into the channel.

Similarly, each of two front frame members 210 and 212 have channels dimensioned to receive the front edge of a corresponding side panel 108 or 110 with an edge-inchannel fit. The hinges 130 through 140 are mounted along one side thereof to a door, e.g. door 112, and along the other side thereof to a front frame piece, e.g. front frame piece 210, to hingedly couple each door 122 or 114 to side panel 108 or 110, respectively.

The base 116, as illustrated in FIG. 2, has a channel 250 and 252 along each side and a channel 254 along the back thereof. The side channels 250 and 252 are positioned and dimensioned to receive the bottom edge portion of side panels 108 and 110, respectively. The bottom edge portio 111 of the back panel 106 is similarly received by channel 254 with an edge-in-channel fit. The side panels 108 and 110 are received in channels 250 and 252, the back panel 106 is inserted in channel 254.

Extending downward from each front frame member 210 and 212 are metal tabs 260 and 262, respectively, which are positioned and dimensioned to be inserted into slots 264 and 266 in the base 116. Tabs 260 and 262 are provided with threaded holes 261 and 263 and with counter non-threaded holes 265 and 267 illustrated in FIG. 3. Screws 271 and 273 extend through the front face kick plate 117 of base 116 and are threaded into holes 261 and 263 when the side panels 108 and 114 are properly engaged with the base 116. Tapered screws are inserted through holes 265 and 267 and are threaded into nuts welded to the base 116 to further secure side panels 108 and 114 to base 116. The base 116 rests on glides 268 which are adjustable in height to raise or lower corners of the base 116.

There are two further countersunk holes at the upper end of front frame members 210 and 212, holes 275 and 277 in member 210 and holes 281 and 2B3 in member 212. Screws are inserted through these holes and threaded into corresponding threaded holes 301–304 in tabs 270 and 272 of overchest 104 if utilized or into corresponding threaded holes 305–308 in L-shaped plates 290 and 292 if the top panel member is to be attached directly to the cabinet 102 without the optional intervening overchest 104.

The holes 275, 277, 281 and 283 being countersunk, more effectively draw together the structural members to maintain better adjustment and thereby provide a stronger, more resilient box frame structure for better overall strength and structural integrity.

The holes through front frame member 210 and 212 corresponding to the threaded holes in tabs 310 and 312 of shelf 150 are also countersunk to provide for increased structural tightness and integrity.

FIG. 2 also shows the component parts of the overchest 104 of FIG. 1. In FIG. 2, the two side panel members 162 and 163 are shown having metal tabs 270 and 272 positioned downward therefrom to be insertable into slots 274 and 276, respectively, in overchest bottom member 154. Specifically, two side channel members 280 and 282 receive side panel members 162 and 163, respectively, wherein the tabs 270 and 272 extend from the side channel members 280 and 282, respectively. The side channel members 280 and 282 have a top portion whereat one leg of an L-shaped plate 290 or 292, respectively, is fastened. The other leg of each L-shaped plate 290 or 292 fits against the lip 294 of a crosspiece. This piece is part of top panel 164 and is fastened thereagainst to provide a rigid fastening between side panel members 162, 163 and top panel member 164. Backing plates 296 and 297 are positionable above the front overhang of the top panel member 164. A sandwich structure—with the hinge 298, front overhang of the top panel 164, backing plate 296, as successive layers—is formed which provides rigidity and a reinforced hinged coupling. Two orthogonal channel members 300 and 311 receive side panel members 162 and 163 and back panel member 160 (like back frame members 124 and 126 of the basic cabinet 102). In fact, it is noted that the design of the overchest 104 is closely analogous to the basic cabinet 102—except for some variations such as the inclusion of a front flap 166 rather than two doors 112 and 114.

Also shown in FIG. 2 is the shelf 150 which has two clothes rod hooks 310 and 312. The shelf 150 is held in place—when the cabinet 100 is assembled—by inserting the side portions thereof into upwardly protruding lips 314 fastened along each side panel 108 and 110. Optionally, the back portion can be inserted into a back lip 316 fastened to the back panel 106. Specifically, the side portions of the shelf 150 fit between the respective lip 314 and the side panel 108 or 110, respectively.

Figure 3:
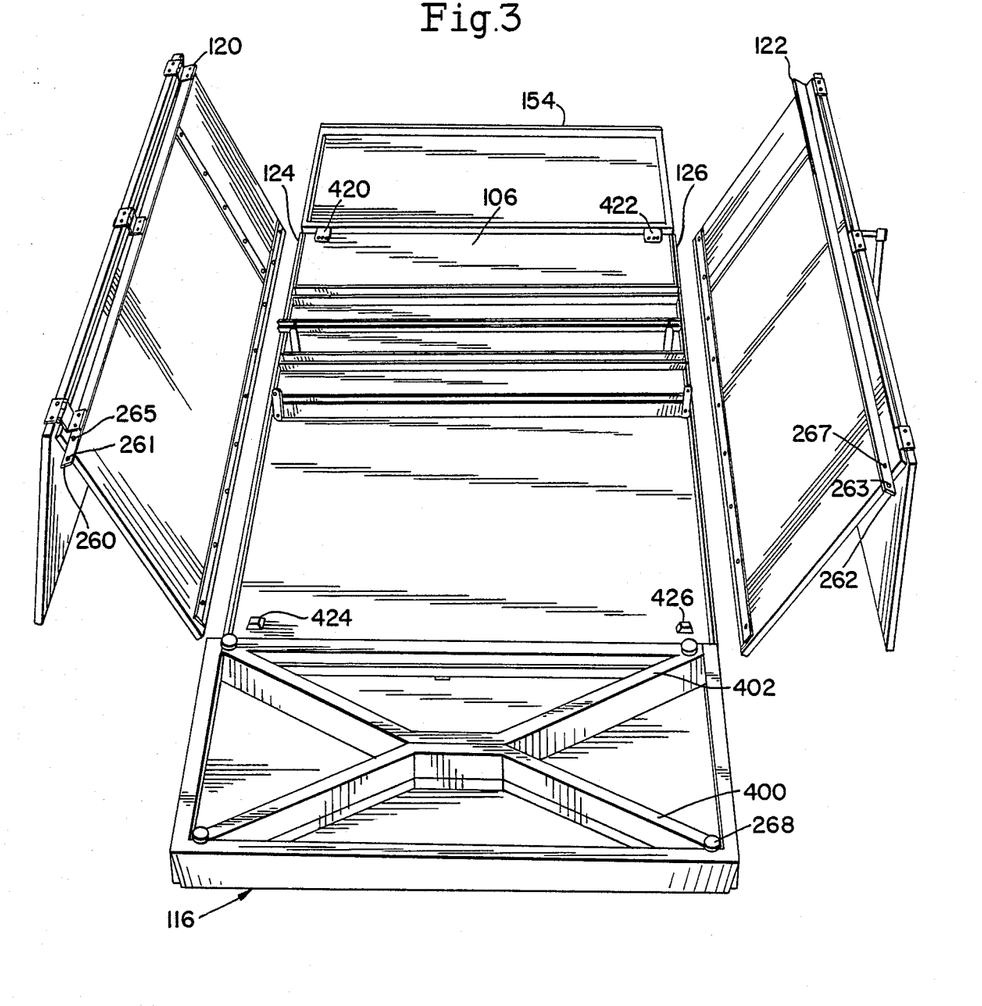
FIG. 3 a view of a first embodiment of a wardrobe cabinet, without overchest, in a disassembled state, as taught by the present invention.

FIG. 3 shows the basic cabinet 102 disassembled, or knocked-down. FIG. 3 also shows a bottom view of base 116. Two reinforcement elements 400 and 402 form a horizontal-x support structure which adds rigidity and stability to the base 116. The base 116 is also shown to include a rectangular box structure of unitary—or single piece—construction to further provide rigidity and strength required for supporting heavy loads.

The base 116 is of metal—preferably steel—except for the plastic glides 268. Similarly, the frame members 120, 122, 124, 126—as well as the rectangular frame 170—are made of metal such as steel. The hinges 130 through 140 and hinges 298 and 299 are also preferably of steel, as is the lock mechanism. Moreover, the channels and channel members are all likewise preferably of steel construction. Shelf 150, top member 164, overchest bottom 154, and lips 314 and 316 are also preferably of steel, as are the tabs 260, 262, 270 and 272. L-shaped plates 290 and 292 and backing plates 296 and 297 are also preferably steel.

The panels 106, 108, 110, 112 and 114, and the panel members 160, 162, 163, 164 and 166 are preferably formed of particle-board with a high pressure plastic coating.

In examining FIG. 3, it is noted that all metal to particle board fastening is fixed and that assembly and disassembly is effectuated by making metal-to-metal coupling or decoupling or by tab-in-slot or edge-in-channel channel insertions. This facilitates assembly/disassembly wherein the need for applying and removing fasteners from particle-board which would adversely affect cabinet life is avoided.

Bend elements 420 through 426 permit metal-to-metal fastening of (a) top member 164 to the back panel 106 and (b) base 116 to the back panel 106. Where overchest is used bend elements 420 through 426 permit metal-to-metal fastening of (a) top member 164 to back panel 169 (b) overchest bottom to 154 to back panels 160 and 106 and (c) base 116 to the back panel 106.

The shelf 150 and bend elements 420, 422, 424 and 426 provide significantly increased rigidity to the wardrobe through tieing together and monitoring a fixed relative positioning of the base 116, back panel 106 and overchest bottom 164. By securing these members to one another, a rigid box structure is formed. This box configuration transmits the strength of the base of the unit up through the entire unit.

Figure 4:
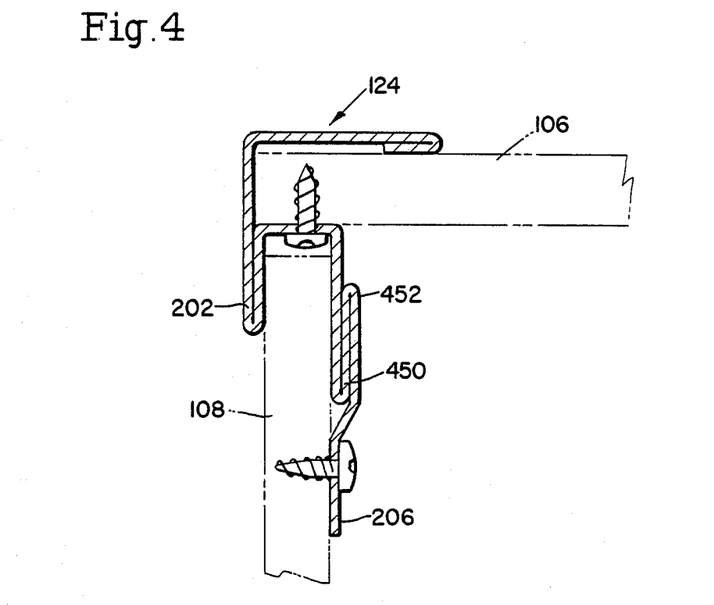
FIG. 4 is an illustration of the transverse cross-section of a back frame member which stably positions the back panel and a side panel relative to each other in a wardrobe cabinet according to a first embodiment of the invention.
Figure 5:
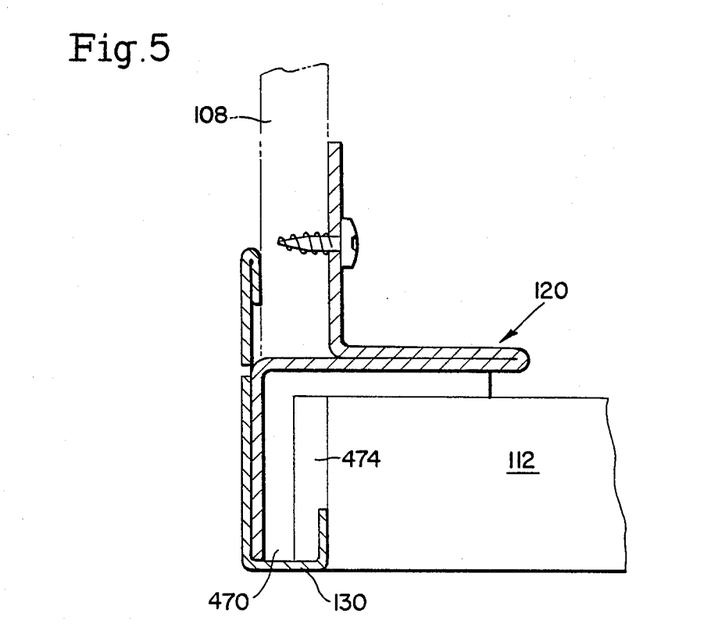
FIG. 5 an illustration of the transverse cross-section of a front frame member of a first embodiment of the present invention, which receives a side panel and is hingedly coupled to a door.

Referring now to FIG. 4 and 5, a transverse cross-section of back frame member 124 and front frame member 120 are shown in detail. The back panel 106 and side panel 108 are shown with dashed lines. Looking first at FIG. 4, the orthogonal channel back frame member 124 is shown with a reverse bend 450. Strip 206 shows an opposite reverse bend 452 which engages reverse bend 450 when the side panel 108 is inserted into the side channel 202. The strip 206 is fixedly fastened to the side panel 108, while the back frame member 124 is fixedly fastened to back panel 106.

In FIG. 5, side panel 108 is fixedly fastened to front frame member 120. FIG. 5 also shows the hinge 130—one side 470 being mounted to front frame member 120 and the other side 474 being mounted against the door 112. The front frame member 120, it is observed, serves as a door jamb reinforcement. The door 112 is closed in FIG. 5 and opens away from front frame member 120.

According to this embodiment of the invention, the various panels are stably positioned relative to each other when the cabinet is assembled by means of edge-in-channel insertion, tab-in-slot insertion, and metal-to-metal coupling—resulting in convenience, long-life and stability.

The structure taught by the present invention provides a wardrobe cabinet with inherent rigidity and load strength. The internal structure of the cabinet is made stable through an overall integrated box structure, enhanced by a horizontal shelf member. The shelf acts to reduce the effective load on the vertical members of the cabinet. Any force exerted on the structure will be split and some component of the force will be dissipated by the shelf so that the distortion of the box structure will be reduced or eliminated.

The rigidity of the structure, as discussed throughout, is accomplished through an interaction of all component elements of the cabinet and by the manner of their assembly. From the rigid cross braced base 116 through the side panels 110 and 108, back panel 106, shelf 150, and frame members 202, 204, 210 and 212 up to top member 164 or overchest 104 a box construction is formed of superior structural integrity.

The extended tabs and countersink holes detailed above serve to pull the structure into a rigidly defined configuration and aid in the overall stable orientation of the components.

Figures 6, 7:
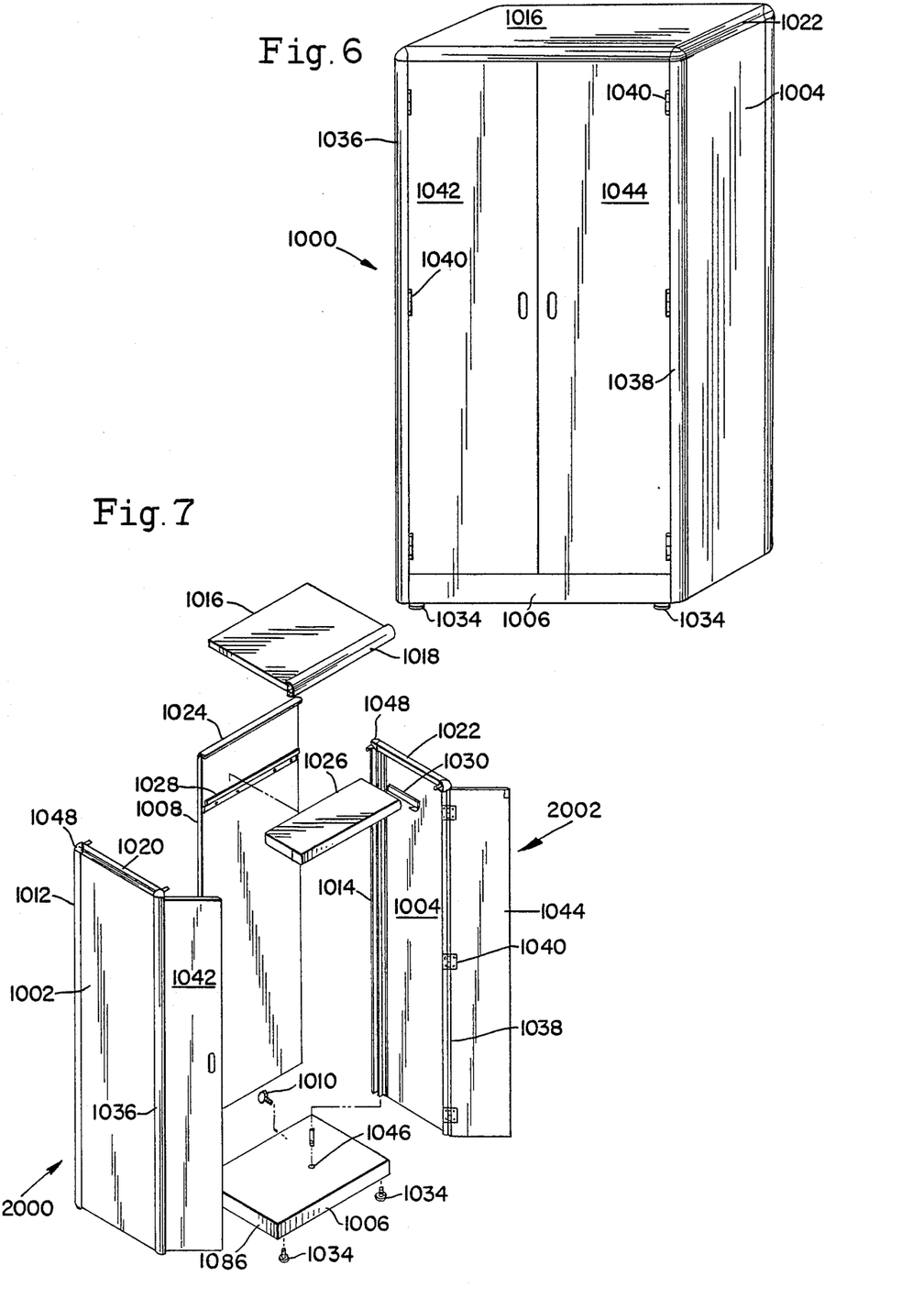
FIG. 6 is a front perspective view of a second embodiment of a cabinet built in accordance with the teachings of the present invention.
FIG. 7 is an exploded assembly view of the second embodiment of the present invention.
Figures 8, 9, 10:
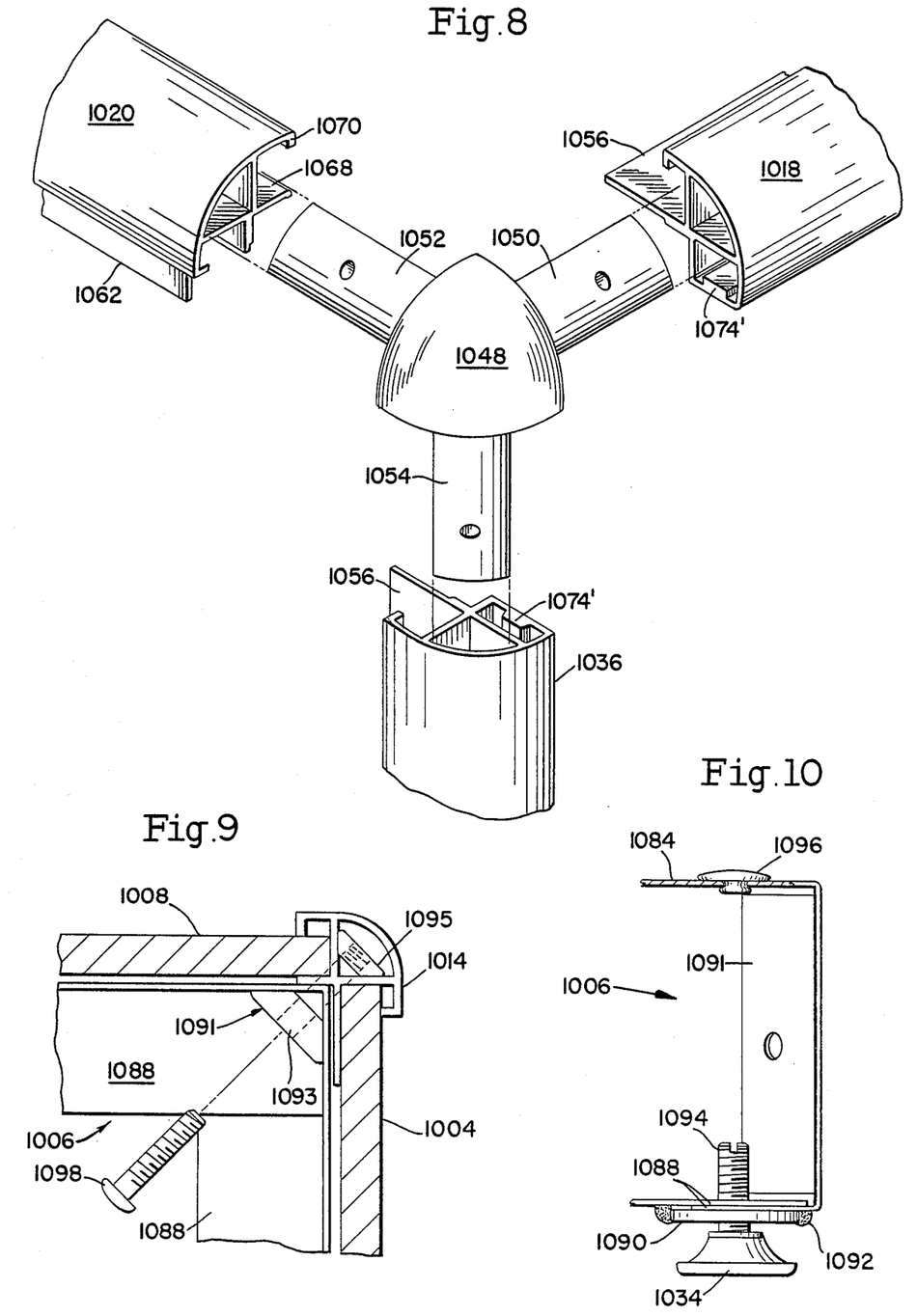
FIG. 8 is a close-up view illustrating the fit of the corner connectors and associated frame members of the second embodiment.
FIG. 9 is a top cut-away view of the base member illustrating the connection of the frame members to the base member of the embodiment.
FIG. 10 is a side cross-section view of the base member illustrating the support feet for the cabinet of the second embodiment.

The cabinet 1000, illustrated in FIG. 6, is constructed in accordance with a second alternative exemplary embodiment of the present invention. This cabinet is illustrated fully assembled with the doors closed in FIG. 6, and is shown disassembled into its major component parts in FIG. 7. FIG. 7 illustrates the final on-site assembly of the major components of the cabinet of the second embodiment of the present invention. Side panels 1002 and 1004 with their associated frame members and doors are attached to base 1006. The vertical frame members are secured to base 1006 as illustrated in FIG. 9 and described in greater detail below. Back member 1008 is first secured to base 1006 by bolts 1010 passing through back panel 1008 and into base 1006. Rear vertical frame members 1012 and 1014 can then engage the edges of panel 1008 as side members with associated framing are attached to base 1006.

Top member 1016 with its associated front horizontal frame member 1018 is then engaged in side horizontal frame members 1020 and 1022 and rear horizontal frame member 1024 as top member 1016 is moved into its position and side and back members are moved into vertical position. Top member 1016 is secured into position by bolts which pass through the flanges of the horizontal frame members as better illustrated in FIG. 12, and described below. Shelf member 1026 is also secured into rear Z-bracket 1028 and side Z-brackets 1030 and 1032. Bracket 1032 is not illustrated but attached to side panel 1002 in the same manner as Z-bracket 1030 is attached to side panel 1004. The Z-brackets are attached to the panels and provide a flange spaced from the panel surface to allow the lips of shelf member 1026 to be engaged by the Z-bracket and the inner surface of the panels.

Feet 1034 are provided to allow for leveling of the cabinet. The attachment of feet 1034 to base 1006 is shown in greater detail in FIG. 10.

Front vertical frame members 1036 and 1038 are attached to side panels 1002 and 1004 respectively. Frame members 1036 and 1038 also carry hinges 1040 for attachment of doors 1042 and 1044. The attachment of hinges 1040 and doors is illustrated in greater detail in FIG. 13 and described below.

FIG. 8 illustrates the interconnection between a corner member 1048 and 3 frame members 1020, 1018 and 1036. Projections 1050, 1052 and 1054 of corner member 1048 fit into the central openings of frame members 1018, 1020 and 1036 respectively. Corner member 1048 is secured within each of the frame members by a screw inserted through the frame member from inside and threaded into each of the extensions of the corner member 1048. The screw is not illustrated but is inserted through the inner surface of the frame member into the corner member. Frame members and corner members can be preferably comprised of extruded metal to provide enhanced rigidity and to maintain the overall cabinet configuration.

Figures 11A, 11B:
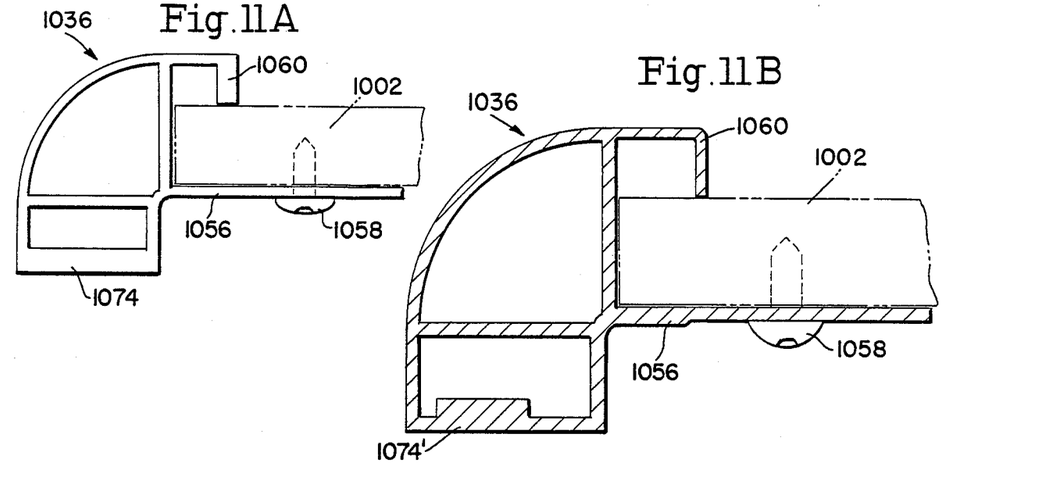
FIG. 11A is an end view illustrating the cross-section of the front vertical support members for the second embodiment of the present invention.
FIG. 11B is a cross-section of an alternative embodiment for the front extrusion illustrated in FIG. 11A.

FIGS. 11A and B illustrate alternative configurations for the cross-section of front vertical frame members 1036 and 1038. Both vertical members have the identical cross-section, however, since FIG. 11A is viewed from above, the cross-section is representative of vertical member 1036 with side panel 1002 engaged therein. Elongated flange 1056 extends parallel to the surface of side panel 1002. Screws 1058 secure the panel member 1002 and frame member 1036. The panel member 1002 is securely seated between flange 1056 and arm 1060 of the frame member 1036.

Figure 12:
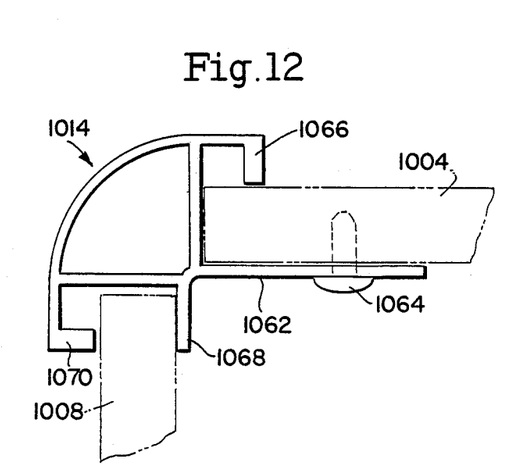
FIG. 12 an end view illustrating the cross-section of the rear and top frame members of the second embodiment of the present invention.

FIG. 12 illustrates the cross-sectional configuration of rear vertical members 1012 and 1014. As FIG. 12 is also viewed from above, it is representative of vertical member 1014 having side member 1004 and back panel member 1008 engaged therein. Vertical frame member 1014 has one extended flange 1062 extending parallel with the interior surface of side panel member 1004. Side panel member 1004 and vertical frame member 1014 are secured together by screws 1064. Side panel member 1004 is then held in engagement with vertical frame member 1014 between flange 1062 and arm 1066. Rear panel member 1008 is not permanently secured to vertical frame member 1014 by screws. This allows for the insertion of rear panel member 1008 into vertical member 1014 during final assembly. Rear panel 1008 is engaged by short flange 1068 and arm 1070 of vertical frame member 1014 after final assembly.

Figure 13:
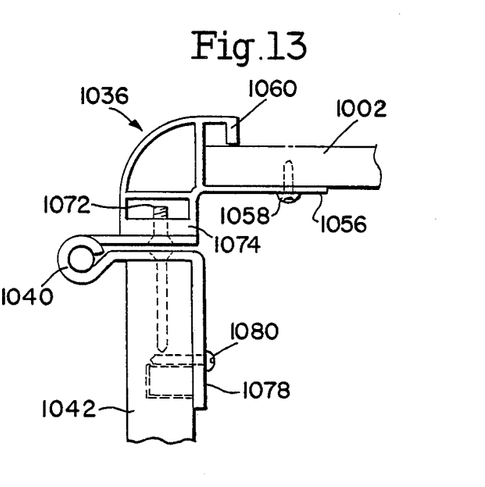
FIG. 13 is a cross-sectional view of a vertical frame member and front door of the second embodiment of the present invention.

FIG. 13 illustrates the connection of door hinges 1040 to front vertical member 1036 and to door 1042. Hinge 1040 is attached to frame member 1036 by flat head countersunk screw 1072. Screw 1072 is threaded into surface 1074 of frame member 1036. Surface 1074 can be a thickened portion of the frame member all the way across as illustrated in Figure 11A or can be a locally thickened portion, 1074' as illustrated in FIG. 11B. The surface needs to be reinforced to allow for an adequate thread depth to sufficiently hold hinges 1040 to frame member 1036.

Hinge 1040 is secured to door 1042 by screw 1076 which is also flat-headed, tapered and countersunk into hinge 1040. Hinge 1040 is further secured to door 1042 by countersunk screw 1078. Secondary screw 1080 is utilized to insure that screw 1078 does not back out.

Horizontal extrusions 1020, 1022 and 1024 have cross-sections as illustrated in FIG. 12. The long flange 1062 of extrusions 1020 and 1022 are secured to the upper edge of side panels 1002 and 1004 respectively.

This leaves the shorter flanged opening of the horizontal frame members free for receipt of the side edges of top panel member 1016. The long flange member 1062 of rear horizontal frame member 1024 is secured to the upper edge of rear panel 1008 thereby leaving the alternate opening of rear horizontal frame member 1024 free to engage the back edge of top panel member 1016. Front horizontal frame member 1018 is similar in cross-section to frame member 1036 as illustrated in FIGS. 11A and 11B. The elongated flange 1056 of frame member 1018 is secured to the front edge of top panel member 1016. The flat surface 1074 of front horizontal frame member 1018 is then free to allow the opening and closing of doors 1042 and 1044.

Figure 14:
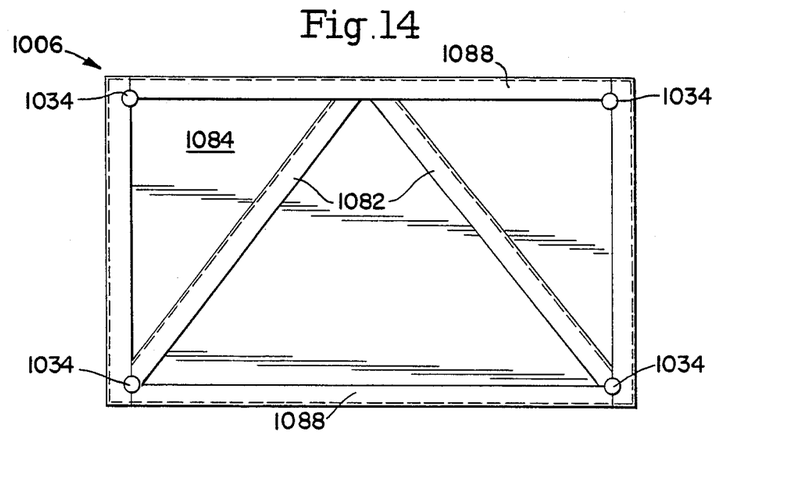
FIG. 14 is a bottom view of the base of the second embodiment of the present invention.

FIG. 14 is a bottom view of the base 1006 of the cabinet of the second embodiment. Truss bracing 1082 can be seen supporting the underside of the base 1006. Feet 1034 are also illustrated in the corners of base 1006. Base 1006 has a solid top surface 1084, vertical sides 1086 and a bottom rim 1088. The base 1006 is comprised of a single sheet of material folded into this configuration. Truss bracing 1082 is then added.

FIG. 10 illustrates the mounting of feet 1034 to base 1006. Nuts 1090 are welded 1092 to the bottom rim 1088 where the separate rim flanges overlap to provide a double metal thickness. The threaded shaft 1094 of foot 1034 is threaded through nut 1090 and adjusted to the proper height. Foot 1034 can be adjusted directly by grabbing 1034 and turning or can be adjusted from above through the top surface 1084 of base 1006. Plug 1096 can be removed and a screw driver inserted in the hole to engage the slot in the top of threaded shaft 1094. Foot 1034 can thereby be adjusted through rotation of the screw driver.

FIG. 9 illustrates the attachment of vertical frame member 1014 to base 1006. The other vertical frame members 1012, 1036, and 1038 are attached to their appropriate corners in a similar manner. Bolt 1098 is inserted through hole 1093 in wedge spacer 1091. Bolt 1098 extends through the hole drilled in the corner of base 1006 and the hole in vertical member 1014 to engage nut 1095. Bolt 1098 is tightened into nut 1095 to secure vertical frame member 1014 in position engaged on base 1006.

As stated earlier, the final on-site assembly of the wardrobe cabinet is accomplished from the major components illustrated in FIG. 7. The major components are comprised of a number of smaller sub-assemblies which are preassembled prior to shipping to aid in faster final assembly. The preassembly also allows for a single engagement of all threaded screws which are seated in the particle board panels comprising the side panels, back panel, top panel and/or door panels. Therefore, the final assembly comprises only metal-to-metal fittings. This allows for multiple assembly and disassembly of the unit without fatigue of parts. The frame members are attached to their appropriate panel members with screws as illustrated in Figures IIA, 11B and 12 as appropriate. The hinges and doors are also attached to the frame members during the preassembly process.

On-site assembly is therefore accomplished in the following manner. Back panel 1008 is attached to base 1006 by bolts 1010 which extend through back panel 1008 and engage nuts inside base member 1006. Here again, there is no threading of wood components but only metal-to-metal engagement. Side sub-assemblies 2000 and 2002 can then be added. Side sub-assembly 2000 consists of side panel 1002, vertical frame members 1012 and 1036, horizontal frame member 1020, two corner joints 1048, door 1042 and its associated hinges. Side sub-assembly 2002 consists of corresponding members 1004, 1014, 1038, 1022, 1048, 1044 and hinges 1040. The vertical members of these side sub-assemblies are attached to the base member 1006 as illustrated in FIG. 9. As the side sub-assemblies are moved into position, back panel 1008 is engaged in the opening in vertical frame members 1012 and 1014 as described above.

Once the side sub-assemblies have been secured to the base at their bottom, shelf member 1026 is positioned along Z-bracket 1028 and engaged into Z-brackets 1030 and 1032 as side sub-assemblies are moved into their fully vertical orientation. Top panel member 1016 is also positioned to be engaged in open slots of horizontal frame members 1020, 1022 and 1024 as the back panel and side sub-assemblies are moved into their fully vertical positions.

As can be seen, the second embodiment of the present invention also provides for a knock-down wardrobe cabinet which can be readily, quickly and easily assembled on site with a minimum number of tools and hardware. The present invention as stated earlier also provides for only metal-to-metal contact engagement and threading during final assembly and during disassembly for shipping and reassembly, this avoids the fatigue associated with repeated metal-to-wood or particle board coupling.

Other improvements, modifications, and embodiments will become apparent to one of ordinary skill in the art upon review of this disclosure. Such improvements, modifications and embodiments are considered to be within the scope of this invention as defined by the following claims.

We claim:
1. A knock-down wardrobe cabinet comprising:
a back panel;
two side panels;
a base member;
a top member;
a shelf member;
a first front frame member and a second front frame member; and
a first back frame member and a second back frame member;
said base having a channel along the back edge thereof which is dimensioned to receive the lower portion of said back panel and a channel along each side thereof, each side channel of said base receiving the lower edge portion of one of the said side panels;
said top member having two side channels, and a back channel, each of said side channels receiving the upper edge portion of one of the side panels, and said back channel receiving the, upper edge portion of said back panel;
wherein each back frame member has two substantially orthogonal channels, one of the orthogonal channels being dimensioned to receive a side edge portion of said back panel and the other orthogonal channel being dimensioned to receive a back edge portion of one of said side panels; and
wherein each front frame member has a channel dimensioned to receive a front edge of one of said side panels;
one side panel extending between and being received within channels of the first front frame member and the first back frame member, and the other side panel extending between and being received within channels of the second front frame member and the second back frame member when the cabinet is assembled;

said back panel extending between and being received within channels of the first back frame member and the second back frame member when the cabinet is assembled; and a plurality of tab members having at least two holes therein;

wherein a first of said tab members is coupled to and extends downward below one of said front frame members; and a second tab member is coupled to and extends downward below the other of said front frame members; and two slots and four holes in said base, each slot being positioned to receive a respective one of the two metal tabs;

wherein corresponding holes in said base align with said holes in said tabs when said tabs extend into said slots;

wherein removable fasteners are inserted through aligned holes to maintain rigid axial alignment of said holes and spatial positioning of said base, said back and said two side panels, further comprising:

a reverse curve bend on each back frame member;

a plurality of side panel metal strips, each said side panel metal strip being fixedly fastened to the back portion of each said side panel;

wherein each said side panel metal strip has a reverse curve bend that engages the said reverse curve bend in a corresponding said back frame member for rapid assembly of said cabinet;

third and fourth tab members extending from the front edge of said shelf and rigidly coupling said shelf to said front frame members;

a lip extending around the periphery of said shelf;

a first coupling member extending continuously along said first side panel, across said back panel and along said second side panel a constant distance between said bottom panel and said top panel;

wherein said coupling member is configured for receipt of said shelf lip;

wherein upon engagement of said shelf lip with said coupling member and coupling of said third and fourth tabs with said front frame member, said shelf provides rigid reinforcement for said box structure formed by said top, bottom, side and back panel members.

2. A knock-down wardrobe cabinet according to claim 1, further comprising:

a rectangular box overchest mountable atop said wardrobe cabinet.

3. A knock-down wardrobe according to claim 2 wherein said overchest includes:

two side panel members, a back panel member, an overchest bottom member; and a front flap panel member, wherein said top cabinet member forms the top of said overchest;

an overhanging portion of the top member extending along the upper front edge of the opening; and at least one hinge which hingedly couples said front flap to said overhanging portion.

4. A knock-down wardrobe cabinet according to claim 2, wherein said overchest further comprises:

a plurality of L-shaped plates, each L-shaped plate being coupled along one leg thereof to said top panel member and along the other leg thereof to one of said side panels of said overchest to provide rigid coupling therebetween.

* * * * *